United States Patent
Fordyce, III

(10) Patent No.: US 8,725,642 B2
(45) Date of Patent: May 13, 2014

(54) DELAYED SETTLEMENT TRANSACTIONS

(75) Inventor: Edward W. Fordyce, III, Sedalia, CO (US)

(73) Assignee: Visa International Service Association, San Francisco, CA (US)

( * ) Notice: Subject to any disclaimer, the term of this patent is extended or adjusted under 35 U.S.C. 154(b) by 239 days.

(21) Appl. No.: 12/539,572

(22) Filed: Aug. 11, 2009

(65) Prior Publication Data

US 2010/0274719 A1    Oct. 28, 2010

Related U.S. Application Data

(60) Provisional application No. 61/173,051, filed on Apr. 27, 2009.

(51) Int. Cl.
*G06Q 40/00* (2012.01)

(52) U.S. Cl.
USPC .......................................................... 705/44

(58) Field of Classification Search
USPC .......................................................... 705/44
See application file for complete search history.

(56) References Cited

U.S. PATENT DOCUMENTS

| | | |
|---|---|---|
| 2004/0097217 A1 | 5/2004 | McClain |
| 2005/0006461 A1 | 1/2005 | Shenker et al. |
| 2005/0138390 A1 | 6/2005 | Adams et al. |
| 2005/0283416 A1* | 12/2005 | Reid et al. ............. 705/35 |
| 2006/0026689 A1 | 2/2006 | Barker et al. |
| 2006/0168663 A1 | 7/2006 | Viljoen et al. |
| 2007/0118472 A1* | 5/2007 | Allen-Rouman et al. ...... 705/39 |
| 2007/0251997 A1 | 11/2007 | Brown et al. |
| 2008/0137593 A1 | 6/2008 | Laudermilch et al. |
| 2008/0140447 A1 | 6/2008 | Pourfallah et al. |
| 2008/0222706 A1 | 9/2008 | Renaud et al. |
| 2008/0228627 A1* | 9/2008 | Himmelstein ............. 705/37 |
| 2008/0238610 A1 | 10/2008 | Rosenberg |
| 2008/0275821 A1 | 11/2008 | Bishop et al. |
| 2008/0288405 A1* | 11/2008 | John ............................. 705/44 |
| 2009/0076984 A1 | 3/2009 | Guionnet |
| 2009/0108063 A1 | 4/2009 | Jain et al. |

FOREIGN PATENT DOCUMENTS

EP    10804210 A1    7/2007

OTHER PUBLICATIONS

Political Risk Analysis: A Study of the Overseas Private Investment Corporation and Private Firms Engaged in Political Risk Insurance and Management Analysis Brennglass, Alan Charles. New York University, ProQuest, UMI Dissertations Publishing, 1980. 8110718.*
Secrecy in Political Communication: Aspects of an Analytical Framework Corrigan, Dennis Michael. University of Illinois at Urbana-Champaign, ProQuest, UMI Dissertations Publishing, 1980. 8017925.*
The St. Lawrence Seaway: Economics for Canadians Willis, R B. Quarterly Review of Commerce (pre-1986) 8.4 (1941): 249.*
International Search Report and Written Opinion dated Nov. 26, 2010, corresponding to PCT/2010/032504, 9 pages.

* cited by examiner

*Primary Examiner* — Hani M Kazimi
*Assistant Examiner* — Hatem M Ali
(74) *Attorney, Agent, or Firm* — Kilpatrick Townsend & Stockton LLP

(57) ABSTRACT

Methods for deferring settlement of a transaction are disclosed. A server computer receives an authorization request message for a transaction. The server computer then receives an authorization response message for the transaction. The server computer then receives a deferred settlement indicator for the transaction.

25 Claims, 5 Drawing Sheets

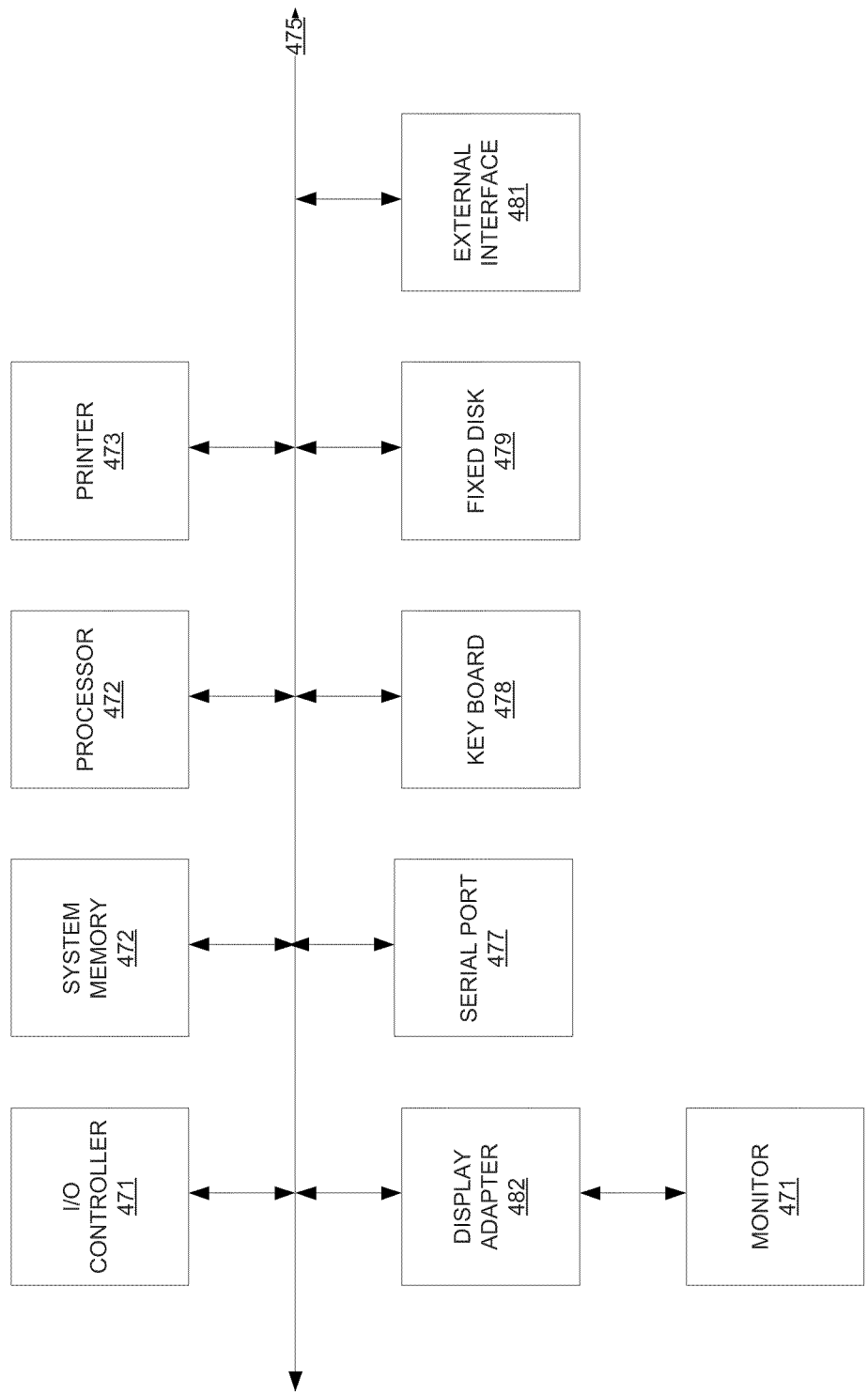

DELAYED SETTLEMENT TRANSACTIONS

CROSS-REFERENCES TO RELATED APPLICATIONS

This application claims the benefit of U.S. Provisional Patent Application No. 61/173,051, filed Apr. 27, 2009, entitled "DELAYED SETTLEMENT TRANSACTIONS", the entirety of which is incorporated by reference herein.

BACKGROUND

Merchants who accept credit cards, debit cards, prepaid cards, and the like, as a form of payment typically receive a transaction settlement (payment of funds) within a short time period after the transaction. A normal transaction settlement is prompt, typically within 2 days of the transaction, with no predefined time period. The merchant pays a discount rate fee for participating in the credit transaction, which is reflected in the settlement. Accordingly, the amount of funds ultimately received by the merchant is less than the transaction charged to the consumer.

A portion of the discount rate fee is attributed to the risk of consumer default, as the issuer pays the merchant before the issuer is paid by the consumer. Thus, the issuer bears the majority of the risk of consumer default in the transaction and transfers a portion of the risk to the merchant, in the form of the discount rate fee. However, merchants have little to no control for setting or reducing the discount rate fee.

BRIEF SUMMARY

Embodiments of the invention are directed to systems and methods for deferred settlement transactions.

One embodiment is directed to a method for deferring settlement of a transaction. The method comprises receiving, at a server computer, an authorization request message for a transaction, receiving, at the server computer, an authorization response message for the transaction, and settling the transaction, using the server computer, after a deferred amount of time after the transaction.

Another embodiment is directed to another method for deferring settlement of a transaction. The method comprises sending, from a server computer, an authorization request message for a transaction, receiving, at the server computer, an authorization response message for the transaction, and sending, from the server computer, a deferred settlement indicator for settlement of the transaction.

Yet, another embodiment is directed towards a computer readable medium with computer readable program code embodied therein, said computer readable program code adapted to be executed to implement either of the above methods.

These and other embodiments of the invention are described in further detail below.

BRIEF DESCRIPTION OF THE DRAWINGS

FIG. 4 shows a block diagram of an exemplary computer apparatus for use with the embodiments disclosed herein.

DETAILED DESCRIPTION

Figure 1:
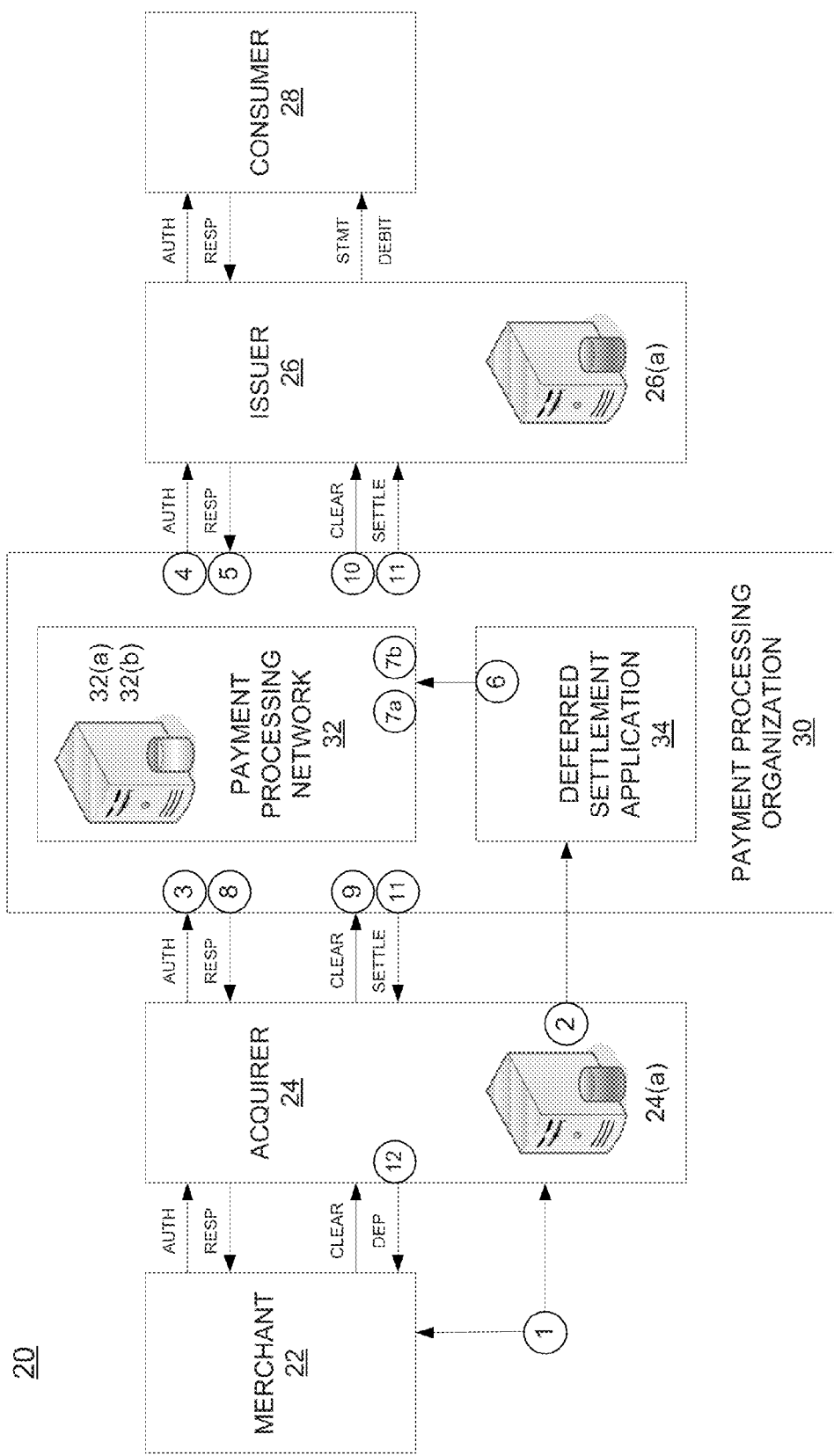
FIG. 1 shows a block diagram of a system for deferring settlement of a transaction, according to an embodiment of the invention.

Embodiments of the invention allow a merchant and acquirer to defer settlement for a transaction. A deferred settlement is a process whereby transaction settlement occurs later than a normal and prompt settlement. A normal settlement process is completed within one or two days, whereas a deferred settlement process can defer settlement for a longer period of time (e.g., greater than 7, 14, 21, or 30 days). The merchant and/or acquirer can choose, on a per transaction basis, to defer settlement on individual transactions or groups of transactions. In doing so, the merchant and/or acquirer can assume part of the risk of the transaction. By assuming at least some of the transaction risk from the issuer, merchants and/or acquirers can advantageously pay a lower transaction fee (e.g., merchant discount rate, interchange rate, etc.) in exchange for taking on the risk Thus, a deferred settlement process can have a greater value than a normal or non-deferred settlement.

Illustratively, the merchant and the acquirer form an agreement regarding which types of transactions are acceptable for deferred settlement. The agreement may specific that specific types of transactions or groups of transactions are subject to the deferred settlement process, while other transactions are not. The acquirer then sends parameters regarding acceptable transactions for deferred settlements to a payment processing organization (or other suitable organization) that can maintain the parameters in a database.

The merchant and a consumer may conduct a transaction, using a credit card, debit card, prepaid card or the like. An access device at the merchant electronically sends an authorization request message to the consumer's issuer for approval of the transaction. The authorization request message is first typically electronically transmitted to the merchant's acquirer, through the payment processing organization, and then to the issuer. The issuer approves the transaction (assuming that there are sufficient funds or credit in the consumer's account and the potential risk of fraud is low) and sends an authorization response message to the payment processing organization.

A server computer at the payment processing organization utilizes the parameters sent by the acquirer to determine if the transaction is eligible for a deferred settlement. The server computer at the payment processing organization then rates the transaction based on risk of the consumer default. The server computer at the payment processing organization then quantifies the risk with an authorization score, which is inserted into the authorization response message and sent to the merchant and/or acquirer. The access device at the merchant receives the authorization response message, and can then complete the transaction with the consumer at the point of sale.

The merchant and/or acquirer (or the server computer located therein) use the authorization score to determine if they wish to defer settlement of the transaction based on the calculated risk in return for reduced transactions fees, or take the standard settlement and associated standard transaction fees. The merchant and/or acquirer then agree to defer settlement and send the payment processing organization a clearing record of the transaction, which includes a deferred settlement indicator.

The payment processing organization (or the server computer located therein) then informs the issuer of the deferred settlement, which results in lower transactions fees for the merchant and/or acquirer, for assuming the risk of default by the consumer during the deferment period. In some instances, the merchant and/or acquirer are liable for the default, despite the fact that the transaction was authorized. A deferred settlement process is advantageous to the issuer through eliminated liability of default. The issuer also gains greater control of available funds and determining future needs, as deferred settlement payment schedules can be exactly forecast.

If the consumer is using a bank debit card or prepaid card, the issuer can collect funds from the consumer immediately and collect interest on the funds until settlement is scheduled. If the consumer disputed the transaction, the issuer would return funds to the consumer and hold settlement with the merchant. Corporate, purchasing and fleet card transactions would function similarly to credit transactions, though nuances may exist depending on the settlement terms between the issuer and their corporate client. Small business credit transactions would function similarly to consumer credit, and small business debit transactions would function similarly to consumer debit.

After the deferment period has ended, the payment processing organization can settle the transaction by collecting funds from the issuer and sending the funds to the acquirer and/or merchant. The payment processing organization can also charge the acquirer and/or merchant and/or issuer, for managing the deferred settlement process. Relations with merchants and acquirers may be improved, as the payment processing organization would be delivering a service which allows them to gain some control over fees, such as interchange costs. The payment processing organization can manage, or supply, an application for merchants and/or acquirers which would allow them to set default parameters for transactions to receive deferred settlement. For example, transactions with a risk score of a particular size or over a particular dollar amount can be automatically registered for deferred settlement. Transactions which did not meet these parameters would be processed normally, or can be evaluated individually.

As used herein, an "issuer" is typically a business entity (e.g., a bank) which maintains financial accounts for the consumer and often issues a portable consumer device such as a credit or debit card to the consumer. The consumer may be a commercial entity, such as a small business. A "merchant" is typically an entity that engages in transactions and can sell goods or services. An "acquirer" is typically a business entity (e.g., a commercial bank) that has a business relationship with a particular merchant or other entity. Some entities (e.g., large retail establishments) can perform both the merchant and acquirer functions, and can directly communicate with the payment processing organization. Embodiments of the invention encompass such single entity merchant-acquirers.

FIG. 1 shows a system 20 that can be used in an embodiment of the invention.

For simplicity of illustration, one merchant 22, one issuer 24, one acquirer 26, and one consumer (e.g., cardholder) 28 are shown. It is understood, however, that embodiments of the invention may include multiple merchants, issuers, acquirers and consumers. In addition, some embodiments of the invention may include fewer than all of the components shown in FIG. 1. Also, the components in FIG. 1 may communicate via any suitable communication medium (including the Internet), using any suitable communication protocol.

The system in FIG. 1 includes a merchant 22 and an acquirer 26 associated with the merchant 22. In a typical payment transaction, a consumer 28 may purchase goods or services at an access device such as point of sale (POS) terminal (not shown) from the merchant using a portable consumer device (e.g., a credit card, debit card, prepaid card or the like). The consumer 28 may also purchase goods or services indirectly (e.g., an Internet purchase) using a Internet based payment system. The acquirer 26 can communicate with an issuer via a payment processing network.

Examples of suitable access devices at or operated by the merchant may include point of sale (POS) devices, cellular phones, PDAs, personal computers (PCs), tablet PCs, gateways, handheld specialized readers, set-top boxes, electronic cash registers (ECRs), automated teller machines (ATMs), virtual cash registers (VCRs), kiosks, security systems, access systems, and the like. The access device may use any suitable contact or contactless mode of operation to communicate data to and from a consumer's portable consumer device (e.g., a credit card). For example, an access device can use a wireless communication mode including near field communication such as Bluetooth, RF, infrared, etc.

The acquirer 26 is typically a bank that has a merchant account. The issuer 24 may also be a bank, but could also be a business entity such as a retail store. Some entities are both acquirers and issuers, and embodiments of the invention include such entities. The acquirer 24 and issuer 26 may each operate a server computer 24(a), 26(a), which may have a computer readable medium comprising code for performing the functions that the acquirer and the issuer respectively perform. A server computer is typically a powerful computer or cluster of computers. For example, the server computer can be a large mainframe, a minicomputer cluster, or a group of servers functioning as a unit. In one example, the server computer may be a database server coupled to a Web server. A database comprising account number information and other information may be operatively coupled to the server computer.

The server computer 24(a) of the acquirer 24 may comprise a computer readable medium with computer readable program code embodied therein. The computer readable program code may comprise: (i) code for sending, from a server computer, an authorization request message for a transaction; (ii) code for receiving, at the server computer, an authorization response message for the transaction; and (iii) code for sending, from the server computer, a deferred settlement indicator for settlement of the transaction.

The consumer 28 may be an individual, or an organization such as a business that is capable of purchasing goods or services.

The payment processing organization 30 may operate a server computer, which may have a computer readable medium comprising code for performing the functions that the payment processing organization performs. A database comprising merchant and acquirer information, deferred settlement information and other information may be operatively coupled to the server computer.

The payment processing network 32 is a secure network area which is typically a private network segment. It may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

The payment processing network 32 may include a server computer 32(a) operatively coupled to a database 32(b). The server computer 32(a) is typically a powerful computer or cluster of computers. For example, the server computer 32(a) can be a large mainframe, a minicomputer cluster, or a group of servers functioning as a unit. In one example, the server computer 32(a) may be a database server coupled to a Web server. The payment processing network 32 may use any suitable wired or wireless network, including the Internet.

The server computer 32(a) may comprise a computer readable medium with computer readable program code embodied therein. The computer readable program code may comprise: (i) code for receiving, at a server computer, an authorization request message for a transaction; (ii) code for receiving, at the server computer, an authorization response message for the transaction; and (iii) code for receiving, at the server computer, a deferred settlement indicator for the transaction.

The payment processing organization 30 may operate a deferred settlement application 34, which may be separate from, or integrated with, the payment processing network 32 (and the server computer located therein). The deferred settlement application 34 may be in the form of a computer program that is used to determine the risk of consumer default for a transaction, and to apply deferred settlement processing based on received merchant/acquirer parameters. The deferred settlement application 34 may retrieve data from and/or process data from one or more databases (e.g., 32(b)) which stores parameters sent by merchants and/or acquirers regarding deferred settlements. The deferred settlement application 34 may include control logic for receiving and updating the parameters, and also for providing access (e.g., on-line) to the merchants and/or acquirers for supplying and updating the parameters.

The deferred settlement application 34 may include control logic for determining reduced transaction fees for a deferred settlement process. The reduced transactions fees may be based on the predetermined characteristics such as the type of transaction (e.g., credit, debit, pre-paid card) and time period for deferral. For example, the control logic may include a sliding scale for adjusting transaction fees based on the time period for deferral, where a longer time period results lower fees compared to a shorter time period.

The deferred settlement application 34 may also include control logic for determining the risk level of a transaction. The deferred settlement application 34 may use a risk management system to calculate an authorization score, which may be one or more numerical indicators, which indicates the risk of consumer default. An example of a risk management system is Visa's Advanced Authorization which is a risk management system that can capture real-time risk evaluations from Visa's fraud detection systems and transmit this critical risk information in each authorization message. Aspects of such a system can be found in U.S. patent application Ser. No. 10/863,813, which is herein incorporated by reference in its entirety for all purposes. The deferred settlement application 34 may also access one or more databases, which store data regarding risk of consumer default, such as statistical information, consumer credit ratings, credit payment histories, purchasing history, compromised events history, charge-back history, and return history.

Deferred settlement transaction methods according to embodiments of the invention, can be described with reference to FIGS. 1, 2A, and 2B.

Figure 2A:
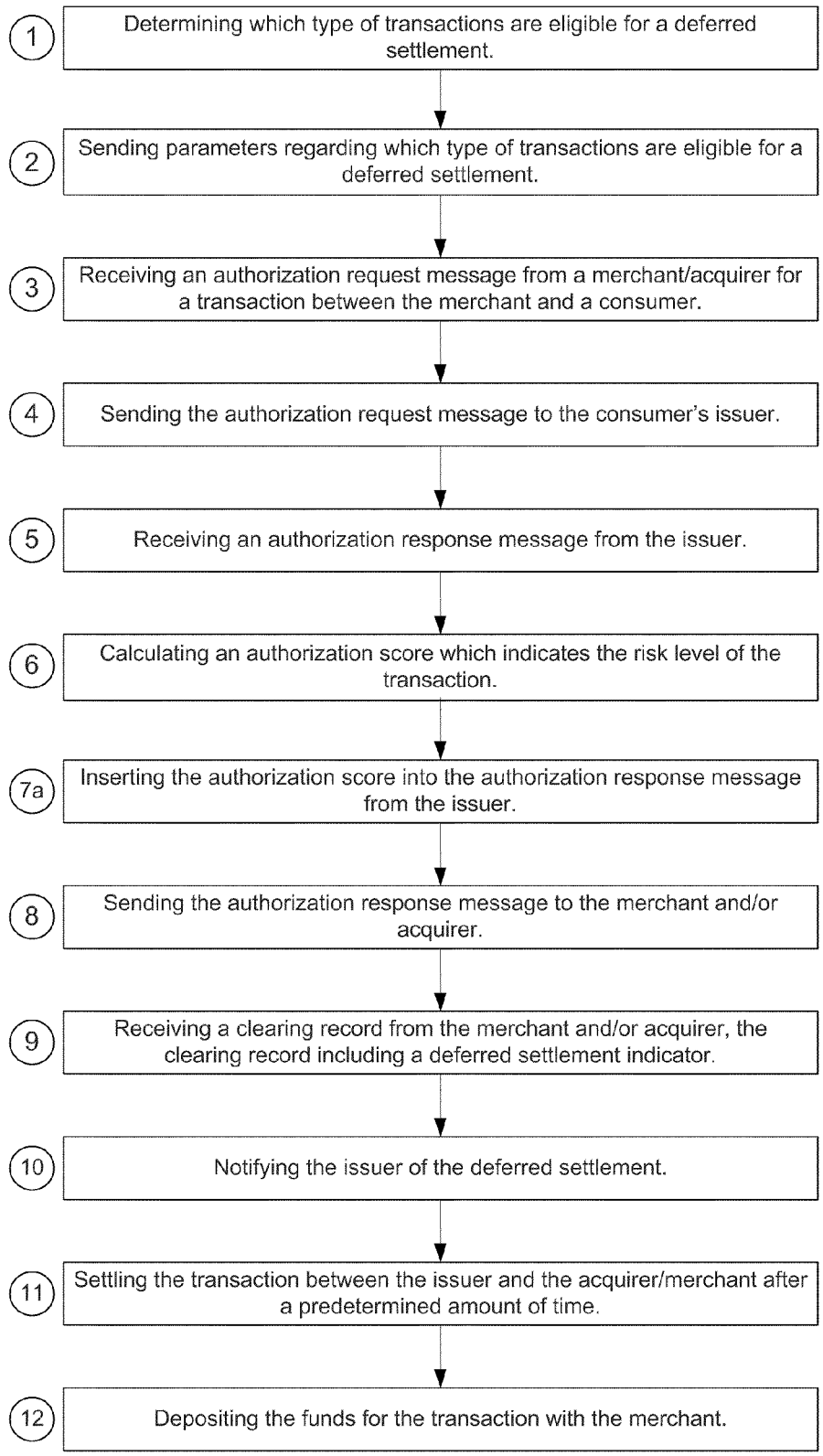
FIGS. 2A and 2B show flow charts of methods for deferring settlement of a transaction, according to embodiments of the invention.
Figure 2B:
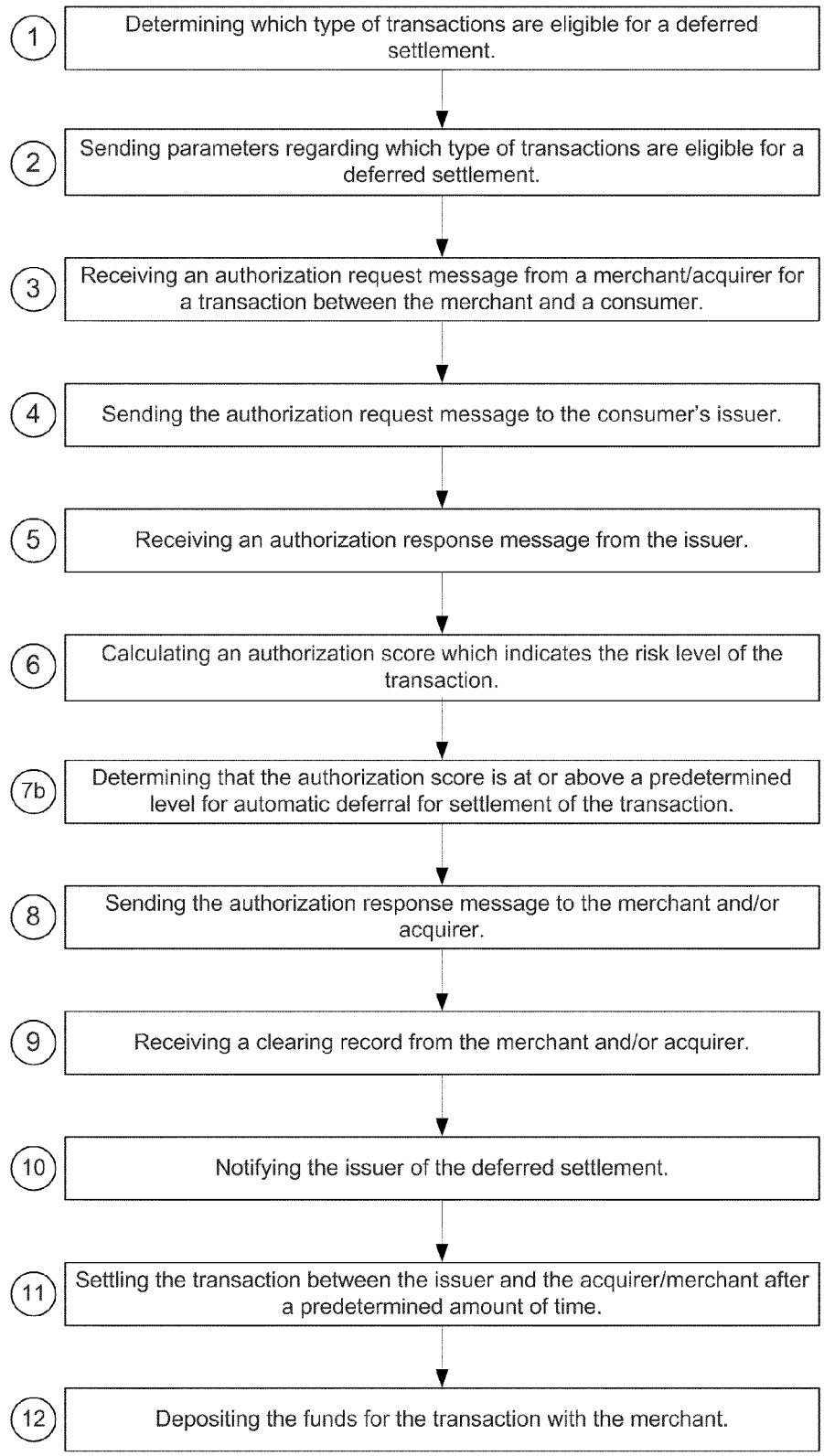
Figure 3:
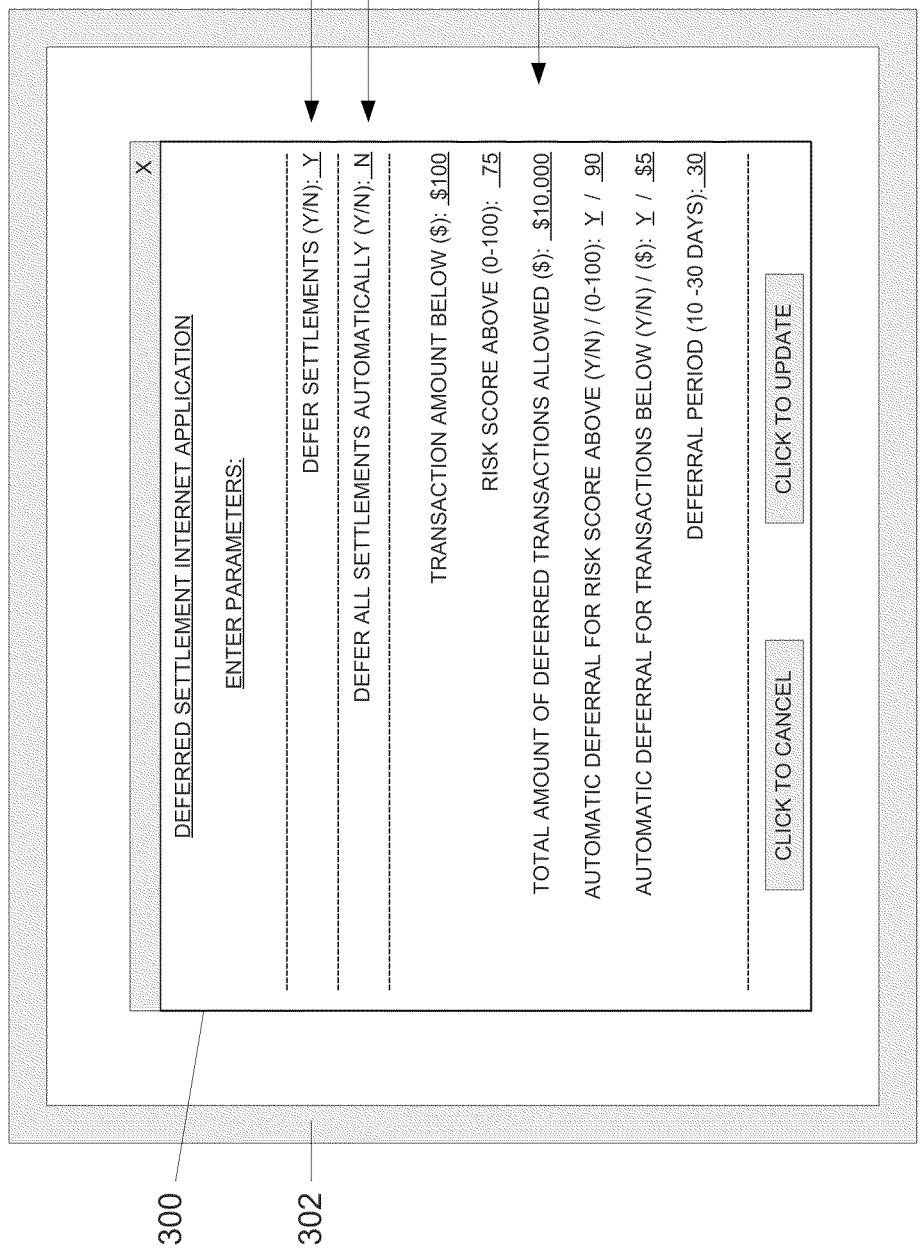
FIG. 3 shows a screen shot of an application for updated settlement deferral parameters, according to an embodiment of the invention.

Referring to FIGS. 1, 2A, and 2B, a merchant 22 and the merchant's acquirer 24 can form an agreement regarding which types of transactions are eligible for a deferred settlement (step 1). Factors may include risk tolerance, transaction amount, and time period for deferral. The acquirer 24 may electronically send parameters, via server computer 24(a), regarding acceptable transactions for deferred settlements, to the deferred settlement application 34 of the payment processing organization 30 (step 2). The deferred settlement application 34 can store the parameters on a database (e.g., database 32(b)).

At a later time, a consumer 28 and a merchant 22 can conduct a transaction for goods or services using a portable consumer device (e.g., credit cards, debit cards, prepaid cards, and the like). An authorization request message for the transaction may be sent from an access device (not shown) at the merchant 22 to the acquirer 24. The acquirer 24 forwards the authorization request message to the server computer 32(a) at the payment processing organization 30, which receives (step 3) and sends the authorization request message to the issuer 26 (step 4). The issuer 26 may approve the transaction and send an authorization response message the payment processing organization 30.

The payment processing organization 30 may receive the authorization response message (step 5), and use the deferred settlement application 34 to determine if the transaction settlement can be deferred according to the merchant and acquirer's parameters. The deferred settlement application 34 may use a risk management system to calculate an authorization score, which may be a numerical indicator which indicates the risk of consumer default. The numerical indicator can be a number can be based on a relative scale (e.g., 1-100 rating score), which is known by the merchant 22 and/or acquirer 24.

Now, only referring to FIGS. 1 and 2A, the payment processing network 32 may insert the authorization score into the authorization response message (step 7a), and send the authorization response message to the merchant 22 and/or acquirer 24 (step 8). The merchant 22 and/or acquirer 24 may use the authorization score to determine if the transaction settlement should be deferred. The merchant 22 and/or acquirer 24 can also use other factors for accepting settlement deferral, such as transaction amount and cash flow needs.

Alternatively, referring to FIGS. 1 and 2B, the deferred settlement application 34 may determine that the authorization score is at or above a predetermined level for an automatic deferred settlement of the transaction. The merchant 22 and/or acquirer 24 may define and supply parameters which qualify a transaction for automatic deferral without requiring specific transaction approval. After determining automatic deferred settlement, the payment processing network 32 may send the authorization response message to the merchant 22 and/or acquirer 24 (step 8). The authorization response message may indicate to the merchant 22 and/or acquirer that the transaction settlement will be automatically deferred, or the merchant 22 and/or acquirer 24 may be later notified.

Again, referring to FIGS. 1, 2A, and 2B, after receiving the authorization response message, the merchant 22 can then complete the transaction with the consumer 28.

At a later time, the merchant 22 and/or acquirer 24 may then send a clearing record of the transaction to the payment processing organization 30. The clearing record may include a deferred settlement indicator, which is an acceptance by the merchant 22 and/or acquirer 24 of deferred settlement. The payment processing organization 30 may receive the clearing record (step 9), and forward the clearing record to the issuer 26 to notify the issuer 26 of the deferred settlement (step 10). The issuer 26 may then provide a statement of debit to the consumer 28.

After a predetermined amount of time (e.g., 30 days), which is predetermined by the merchant 22 and/or acquirer 24 and/or issuer 26, the payment processing organization 30 may settle the transaction with the merchant 22 and/or acquirer 24 and issuer 26 (step 11). Other predetermined amounts of time can be used, for example, from 2-90 days. Alternatively, predetermined dates may be used, such as the end of every month. After the predetermined period of time has expired, the transactions funds may be deposited with the merchant 22, assuming that the consumer 28 did not default (step 12). The funds are of a higher value, than compared to funds received for a non-deferred settlement, as the issuer reduced transactional fees in return for the deferral.

It should be noted that while FIGS. 1, 2A, and 2B show a dual messaging system for separate messaging regarding approval and clearance of a transaction, embodiments of the invention allow deferred settlement using a single messaging system. In a single messaging system, a single message transaction is sent by the merchant 22 and/or acquirer 24 for authorization, clearance, and settlement. For example, in a single messaging system, the merchant and/or acquirer's authorization request message may contain an indicator, which notifies the issuer that they will defer settlement. The merchant 22 and/or acquirer 24 can predetermine what type of transactions are automatically deferred, for example by transaction amount, etc., and store parameters regarding automatic deferral in a database of the server computer 24(*a*). The merchant 22 and/or acquirer 24 can also determine deferring settlement on an individual transaction basis.

Illustratively, the merchant 22 and consumer 28 can conduct a transaction, and the access device at the merchant 22 can send the acquirer 24 an authorization request message. The acquirer 24, using server computer 24(*a*), can evaluate the transaction according to the parameters, and insert a deferred settlement indicator into the authorization request message, and send the authorization request message to the payment processing organization 30, and to the issuer 26. Alternatively, the deferred settlement indicator may originate with the merchant's 22 authorization request message. Alternatively, the payment processing organization 30 can evaluate the transaction based on the merchant and/or acquirer's parameters, and insert the deferred settlement indicator into the authorization request message, which is then sent to the issuer 26. The issuer 26 may respond with an authorization response message, and the transaction can then be settled after a predetermined amount of time.

A merchant and/or acquirer application according to an embodiment of the invention, can be described with reference to FIGS. 1, 2A, 2B, and 3.

The acquirer 24 and/or merchant 22 can electronically send parameters regarding acceptable transactions for deferred settlements, to the deferred settlement application 34 of the payment processing organization 30 (step 2) by using an exemplary software application. FIG. 4 shows a screen shot 300 on a display (e.g. monitor) 302 of a software application for updating and sending parameters to the deferred settlement application 34, which may be accessible at a secure website of the payment processing organization 30 and deferred settlement application 34. At portion 304, the acquirer can decide whether to participate in deferring settlement for transactions by choosing yes or no. The acquirer 24 can decide to automatically defer all settlements as a matter of course, at portion 306, by choosing "yes" or "no." At portion 308, the acquirer 24 can decide on specific eligibility parameters for deferring settlement of transactions. Exemplary choices include transaction amount, risk score, total amount of previously deferred settlements, automatic deferral for some transactions, and deferral period. Other choices are possible, which may be specifically catered for specific merchants and/or acquirers.

Any of the components described above in FIG. 1 can comprise server computers, client computers or may utilize any suitable number of subsystems. Examples of such subsystems or components are shown in FIG. 4. The subsystems shown in FIG. 4 are interconnected via a system bus 475. Additional subsystems such as a printer 474, keyboard 478, fixed disk 479, monitor 476, which is coupled to display adapter 482, and others are shown. Peripherals and input/output (I/O) devices, which couple to I/O controller 471, can be connected to the computer system by any number of means known in the art, such as serial port 477. For example, serial port 477 or external interface 481 can be used to connect the computer apparatus to a wide area network such as the Internet, a mouse input device, or a scanner. The interconnection via system bus allows the processor 473 to communicate with each subsystem and to control the execution of instructions from system memory 472 or the fixed disk 479, as well as the exchange of information between subsystems. The system memory 472 and/or the fixed disk 479 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method for deferring settlement of a transaction, the method comprising:
    receiving, at a server computer, an authorization request message for a transaction from an acquirer or merchant;
    receiving, at the server computer, an authorization response message for the transaction from an issuer, wherein based on the authorization response message the server computer determines a risk level for fraud or default for the transaction;
    inserting, via the server computer, the risk level into the authorization response message;
    transmitting the authorization response message including the risk level to the acquirer or merchant; and receiving, at the server computer, a deferred settlement indicator for the transaction from the acquirer or merchant, wherein the deferred settlement indicator indicates that the risk level is acceptable such that the transaction is to be settled using a deferred settlement process, and wherein the deferred settlement process comprises a deferred settlement for the transaction and a lowered transaction fee, wherein the deferred settlement indicator is part of a clearing record.

2. The method of claim 1, additionally comprising:
sending, from the server computer, the clearing record to the issuer.

3. The method of claim 1, further comprising:
determining, using the server computer, that the authorization score is at or above a threshold for automatic deferral of settlement of the transaction.

4. The method of claim 1, wherein the deferred settlement indicator is based on a predetermined agreement regarding which type of transactions should be deferred.

5. The method of claim 4, wherein the type of transactions eligible for deferred settlement are determined based on at least a time period for deferral.

6. The method of claim 4, further comprising:
generating a plurality of parameters based on the predetermined agreement that defines which type of transaction should be automatically deferred to the settlement process.

7. The method of claim 1, wherein the deferred settlement process comprises deferring settlement of the transaction for at least 30 days.

8. The method of claim 1, wherein the risk level for default for the transaction is determined by analyzing data comprising statistical information, consumer credit ratings, credit payment histories, purchasing history, compromised events history, charge-back history, and return history.

9. The method of claim 1, further comprising:
inserting the deferred settlement indicator into the authorization request message; and
transmitting the authorization request message to the issuer before receiving the authorization response message for the transaction from the issuer.

10. The method of claim 1, further wherein the issuer provides a statement of debit after receiving, at the server computer, the authorization response message and transmitting the authorization response message including the risk level to the acquirer or merchant.

11. The method of claim 1 wherein the authorization request message is received from a POS terminal, after a consumer has interacted with a POS terminal with a portable consumer device.

12. The method of claim 11 wherein the portable consumer device is a debit card.

13. The method of claim 1 wherein the server computer comprises a deferred settlement application that provides on-line access to merchants and acquirers to provide and update deferred settlement parameters to defer settlement with respect to payment card transactions.

14. A method for deferring settlement of a transaction, the method comprising:
receiving, at a server computer, an authorization request message for the transaction;
receiving, at the server computer, an authorization response message for the transaction;
receiving, at the server computer, a deferred settlement indicator for the transaction, wherein the deferred settlement indicator indicates that the transaction is to be settled using a deferred settlement process, wherein the deferred settlement indicator indicates that a risk level is acceptable such that the transaction is to be settled using a deferred settlement process, and wherein the deferred settlement process comprises a deferred settlement for the transaction and a lowered transaction fee;
the method further comprising: calculating, using the server computer, an authorization score;
the method further comprising: inserting, using the server computer, the authorization score into the authorization response message,
wherein the deferred settlement indicator is part of a clearing record.

15. A non-transitory computer readable medium with computer readable program code embodied therein, said computer readable program code adapted to be executed by a processor to implement a method, the method comprising:
receiving, at a server computer, an authorization request message for a transaction from an acquirer or merchant;
receiving, at the server computer, an authorization response message for the transaction from an issuer, wherein based on the authorization response message the server computer determines a risk level for fraud or default for the transaction;
inserting via the server computer the risk level into the authorization response message;
transmitting the authorization response message including the risk level to the acquirer or merchant; and
receiving, at the server computer, a deferred settlement indicator for the transaction from the acquirer or merchant, wherein the deferred settlement indicator indicates that the risk level is acceptable such that the transaction is to be settled using a deferred settlement process, and wherein the deferred settlement process comprises a deferred settlement for the transaction and a lowered transaction fee,
wherein the deferred settlement indicator is part of a clearing record.

16. A system for deferring settlement of a transaction, the system comprising:
a server computer configured to:
receive an authorization request message for a transaction from an acquirer or merchant server computer;
receive an authorization response message for the transaction from an issuer server computer, wherein based on the authorization response message the server computer determines a risk level for fraud or default for the transaction;
insert the risk level into the authorization response message;
transmit the authorization response message including the risk level to the acquirer or merchant server computer; and
receive a deferred settlement indicator for the transaction from the acquirer or merchant server computer, wherein the deferred settlement indicator indicates that the risk level is acceptable such that the transaction is to be settled using a deferred settlement process, and wherein the deferred settlement process comprises a deferred settlement for the transaction and a lowered transaction fee,
wherein the deferred settlement indicator is part of a clearing record.

17. A method for deferring settlement of a transaction, the method comprising:

sending, from a server computer, an authorization request message for a transaction to a payment processing organization;

receiving, at the server computer, an authorization response message for the transaction from the payment processing organization; and generating and sending, by the server computer, a deferred settlement indicator for settlement of the transaction to the payment processing organization, wherein the deferred settlement indicator indicates that a risk level for fraud or default for the transaction is acceptable such that the transaction is to be settled using a deferred settlement process, wherein the deferred settlement indicator is part of a clearing record, and wherein the deferred settlement process comprises a deferred settlement for the transaction and a lowered transaction fee.

18. The method of claim 17, wherein the authorization response message includes an authorization score.

19. The method of claim 18, wherein the authorization score includes the risk level for fraud and/or default for the transaction.

20. The method of claim 19, wherein the risk level is based on deferred settlement parameters previously sent to the server computer.

21. The method of claim 17, further comprising:
receiving, at the server computer, the deferred settlement for the transaction after a predetermined amount of time.

22. The method of claim 21, wherein a value of the deferred settlement is greater than a non-deferred settlement.

23. The method of claim 17, wherein the deferred settlement indicator is part of the authorization request message.

24. A non-transitory computer readable medium with computer readable program code embodied therein, said computer readable program code adapted to be executed by a processor to implement a method, the method comprising:

sending, from a server computer, an authorization request message for a transaction to a payment processing organization;

receiving, at the server computer, an authorization response message for the transaction from the payment processing organization; and generating and sending, by the server computer, a deferred settlement indicator for settlement of the transaction to the payment processing organization, wherein the deferred settlement indicator indicates that a risk level for fraud or default for the transaction is acceptable such that the transaction is to be settled using a deferred settlement process, wherein the deferred settlement indicator is part of a clearing record, and wherein the deferred settlement process comprises a deferred settlement for the transaction and a lowered transaction fee.

25. A system for deferring settlement of a transaction, the system comprising:
a server computer configured to:
send an authorization request message for a transaction to a payment processing organization server computer;
receive an authorization response message for the transaction from the payment processing organization server computer; and
generate and send a deferred settlement indicator for settlement of the transaction to the payment processing organization server computer, wherein the deferred settlement indicator indicates that a risk level for fraud or default for the transaction is acceptable such that the transaction is to be settled using a deferred settlement process, wherein the deferred settlement indicator is part of a clearing record, and wherein the deferred settlement process comprises a deferred settlement for the transaction and a lowered transaction fee.

* * * * *